(No Model.)  7 Sheets—Sheet 1.

W. B. PURVIS.
PAPER BAG MACHINE.

No. 530,650. Patented Dec. 11, 1894.

Witnesses:
Jesse B. Heller.

Inventor.
William B. Purvis
By
Attorney.

(No Model.) 7 Sheets—Sheet 2.

W. B. PURVIS.
PAPER BAG MACHINE.

No. 530,650. Patented Dec. 11, 1894.

Fig. 2.

Witnesses:
Jesse B. Heller.

Inventor.
William B. Purvis
By
Attorney.

(No Model.) 7 Sheets—Sheet 5.
W. B. PURVIS.
PAPER BAG MACHINE.

No. 530,650. Patented Dec. 11, 1894.

Witnesses:
Jesse B. Heller

Inventor.
William B Purvis,
By
Attorney.

(No Model.) 7 Sheets—Sheet 7.

W. B. PURVIS.
PAPER BAG MACHINE.

No. 530,650. Patented Dec. 11, 1894.

Fig. 16.

Witnesses:
Jesse B. Heller

Inventor.
Wm. B. Purvis
By
Attorney.

UNITED STATES PATENT OFFICE.

WILLIAM B. PURVIS, OF PHILADELPHIA, PENNSYLVANIA, ASSIGNOR TO THE EASTERN PAPER BAG COMPANY, OF CONNECTICUT.

PAPER-BAG MACHINE.

SPECIFICATION forming part of Letters Patent No. 530,650, dated December 11, 1894.

Application filed December 15, 1893. Serial No. 493,726. (No model.)

*To all whom it may concern:*

Be it known that I, WILLIAM B. PURVIS, of the city and county of Philadelphia and State of Pennsylvania, have invented an Improvement in Paper-Bag Machines, of which the following is a specification.

My invention relates to paper bag machines, and consists of certain improvements which are fully set forth in the following specification and are shown in the accompanying drawings which form a part thereof.

More particularly my invention relates to that class of machines designed for forming a satchel square bottom upon a bellows side fold tube, in which the paper tube, upon which the bottom is to be formed, is carried between suction formers which are caused to open up or move apart and fold the paper, which adheres to their suction faces, into the proper folds.

The present invention embraces certain improvements in a machine of this character, designed to more perfectly form the bottom of the bag. A part of these improvements is concerned particularly with the devices for clamping and holding the body of the paper tube section while the bottom is being folded by the suction formers, and for releasing the tube when the proper folds have been formed.

Another part of the improvements relates to the feeding devices for feeding the paper tube sections to the carriers, whereby an accurate feed is obtained.

Another part of the improvements relates to the devices for stripping the tube section from the suction formers after the bottom has been formed, whereby wrinkling of the paper is prevented and the final folding and pasting operations may be properly performed.

Another part of the improvements relates to means for adjusting a portion of the machine to suit variations in the size of the bags being made.

I shall describe the invention with reference to the accompanying drawings, which show a paper bag machine, of the general character referred to, having my improvements applied to it.

For the purpose of enabling others to more readily understand my present invention, I shall first describe generally the construction and mode of operation of the machine illustrated, and shall then refer particularly to my improvements therein.

In the drawings: Figs. 8 and 9 are similar views on a reduced scale showing different positions assumed by the suction formers in folding the bag section. Figs. 10, 11, 12, 13 and 14 are perspective views of the paper tube illustrating different steps in the formation of the bag bottom.

A is the main frame of the machine.

B is the tube forming apparatus adapted for forming the paper into the bellows side fold tube. This apparatus may be of the usual well known construction.

B' B' are the flattening feed rolls of the tube former by which the bellows side fold tube is fed to the cutters B² and B⁵ where it is cut into the proper sections.

B³ B³ are the stripping rolls which take the cut tube sections from the cutter B² and convey them to the feed rollers B⁴ B⁴ by which the sections are fed to the bottom forming or folding devices. These bottom forming or folding devices consist of the carriers C, C and formers H, H.

The carriers C, C are two transversely arranged frames located one above the other and adapted to be reciprocated back and forth in the machine by a lever D connected with the carriers and operated through a link E by a crank $E^2$ on the shaft $e$.

The suction formers H, H are hinged as at $h'$ to the carriers C, C and consist each of two hollow sections $H'$ and $H^2$ hinged together as at $h$ and provided with perforated suction faces $d'$ and $d^2$. The tube sections from the feed rolls $B^4$ and $B^4$ are fed between the carriers C, C and suction formers H H and are clamped and held by the carriers C C while the formers H H are operating to fold the paper as will be more fully described hereinafter.

G is a guide or feed chute through which the tube sections are fed to the formers H, H.

I are flexible tubes connecting each of the sections of the formers H, H with a suction flue J in which suction is created by any convenient device.

During the reciprocation of the formers H, H with the carriers C, C the sections $H'$, $H'$ and $H^2$, $H^2$ are caused to move apart and change their relative angular positions so that the paper, which adheres to their perforated faces by reason of the suction from the flue J, is broken or folded into the proper creases. These movements are imparted to the suction formers by means of cams M, N and M, N located respectively above and below the formers, against which the sections of the formers are held by means of springs $f, f$, so that during the reciprocation of the formers with the carriers C, C, the sections $H'$, $H'$ and $H^2$, $H^2$ are caused to move apart and fold the paper. The sections $H'$ and $H^2$ of the formers may be provided respectively with fingers L and O adapted to run in contact with the faces of the cams M, N. These fingers may be provided with friction rollers $l$, $o$.

R, R are folding wings hinged as at $r$ in each side to the carriers C, C and adapted to be folded over upon the faces of the opened suction formers H, H. These wings are acted upon by cam arms S, S arranged in the front of the machine so as to fold down the wings R, R when the carriers C, C are moved forward.

$R'$ are springs acting on the wings to normally hold them open. The wings R, R may be provided with cam pieces $R^2$ adapted to make contact with the cams S, S.

$C^4$ is a gripping roller arranged in front of the formers H, H having a gripping jaw $c^4$ of well known construction adapted to grip the flap of the partially folded paper tube and strip the tube from the formers H, H.

$C^5$ is a feed roller acting in connection with the gripping roller $C^4$ to strip the tube from the formers and feed it between the rollers $C^6$, $C^6$ by one of which paste is applied to the partially formed bottom.

$C^7$ is a flattening roller in the rear of the lower roller $C^6$ and $C^8$ is a second flattening roller below the same roller $C^6$.

$D'$ is the first folder for folding over the first end flap upon the bottom and directing the bag between the rollers $C^6$, $C^7$.

$D^2$ is the second folder for folding over the second end flap upon the bottom and directing the finished bag between the rollers $C^6$, $C^8$ whence it may fall to a carrier $D^3$. The folders $D'$ and $D^2$ are reciprocating plates carried on rocking arms $D^4$ operated through rods $D^5$ from cams $D^6$ on the shaft of one of the rollers, as $C^4$. This form of final folding and pasting apparatus is of well known construction and has been merely selected for purposes of illustration and explanation.

$A'$ is the driving pulley on the main driving shaft $a$ whence the various movements are imparted to the different operative parts of the machine through suitable power transmitting connections. From a gear wheel $A^2$ of the shaft $a$ motion is transmitted through a suitable train of gears $A^3$, $A^4$ to the driving gears $A^5$, $A^6$ of the rollers $B'$ and $B^3$ respectively; and from a pinion $D^7$ on the shaft of one of the rollers $B^3$ motion is transmitted through the intermediate gear $D^8$ to the driving gears $D^9$ of the rollers $B^4$. From a pinion $F'$ on the shaft $a$ motion is transmitted through intermediate gears $F^2$ to the driving gear $F^3$ of a counter shaft $f'$ and from the driving gear $F^3$ to the gear $F^4$ on the crank shaft $e$ by which the lever D is operated.

From the gear $F^3$ power is transmitted through the train of intermediate gears $G'$ to the driving gear $G^2$ of the stripping roller D $C^5$ which through the gear $G^3$ drives the gripping roller $C^4$. Through an intermediate gear $g$ gears $G^4$ of the rollers $C^6$, $C^7$ and $C^8$ are driven from the gear $G^2$.

The swinging cutter bar $B^5$ is operated through elliptical gears $H^4$ from a longitudinal counter shaft $h^3$ driven by bevel gears $H^5$ from a counter shaft $h^4$ and gear $H^6$ operated from the gear $A^2$ on the driving shaft $a$. To induce an intermittent suction in the flue J and formers H, H the flue may be provided with a damper $j$ operated by a cam $J'$ on the shaft $f'$.

V, V are two pivoted folding fingers carried by each former H adjacent to the hinge point between the sections $H'$ $H^2$ and movable across the face of the sections adjacent to their edges when they are partially opened up. These movable folding fingers enter the sides of the partially opened bellows side folds, and assist the suction of the opening formers in shaping the diamond side folds and in breaking the paper into the box shape. These fingers V, V are shown pivoted as at $v^2$ upon frames or supports $v$ carried by the sections $H^2$.

$V'$ $V'$ are springs acting on the fingers V as upon pins $v'$ carried thereby to normally hold the fingers out.

W are spring pins carried in the frames $v$ and adapted to engage the fingers V, V and hold them locked against the action of the springs $V'$ $V'$ when the fingers are turned in.

Figure 5:
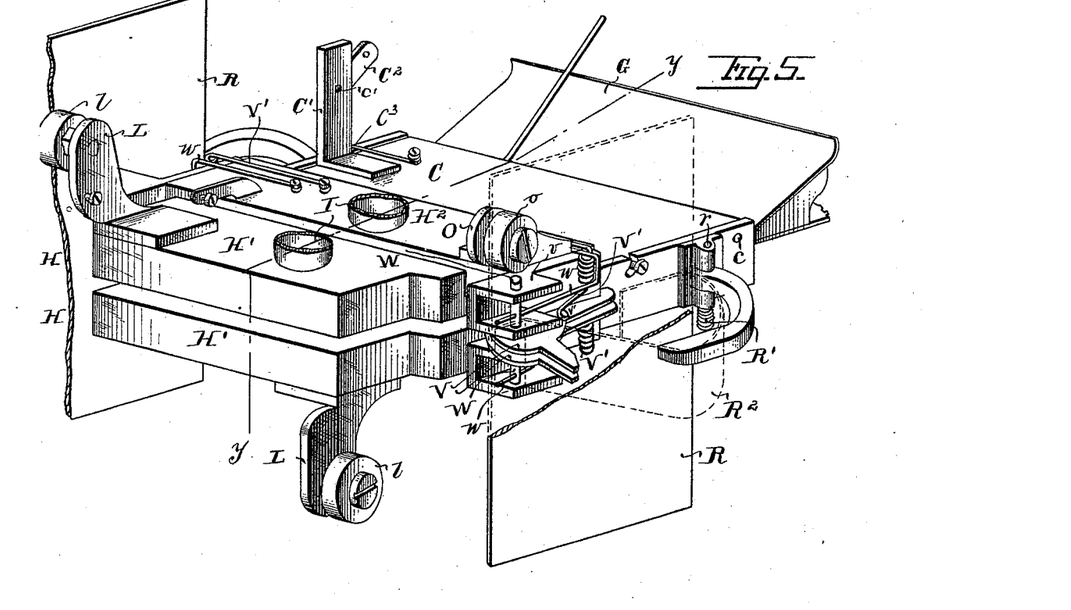
Fig. 5 is a perspective view on an enlarged scale of the detached bottom formers.
Figure 6:
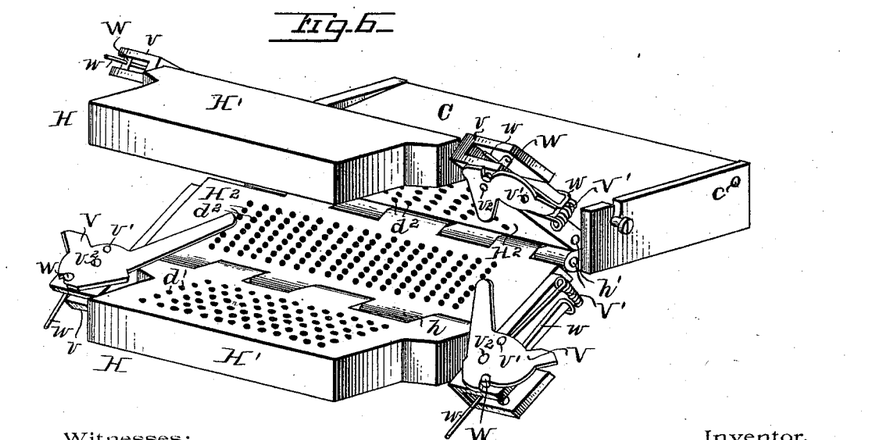
Fig. 6 is a similar view showing the suction formers partially opened.
Figure 7:
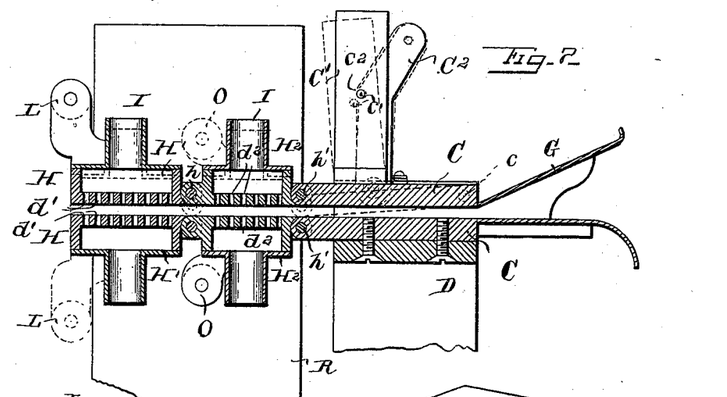
Fig. 7 is a longitudinal vertical sectional view of the bottom formers on the line $y-y$ of Fig. 5.
Figures 8, 9, 10, 11:
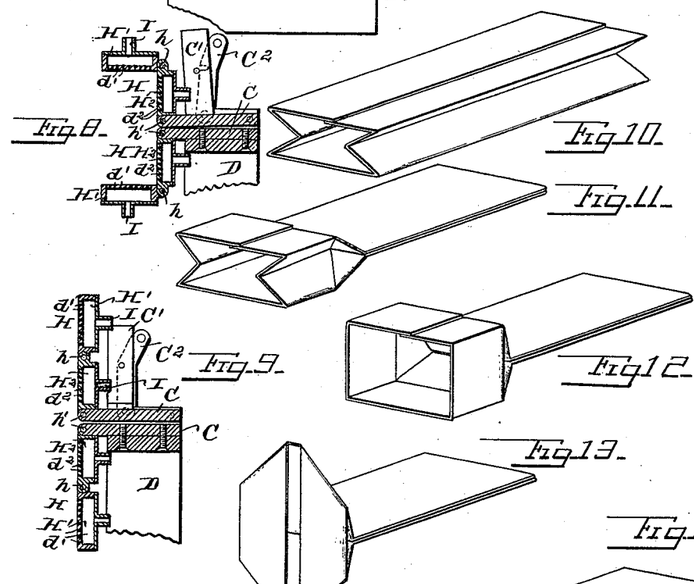
Figure 16:
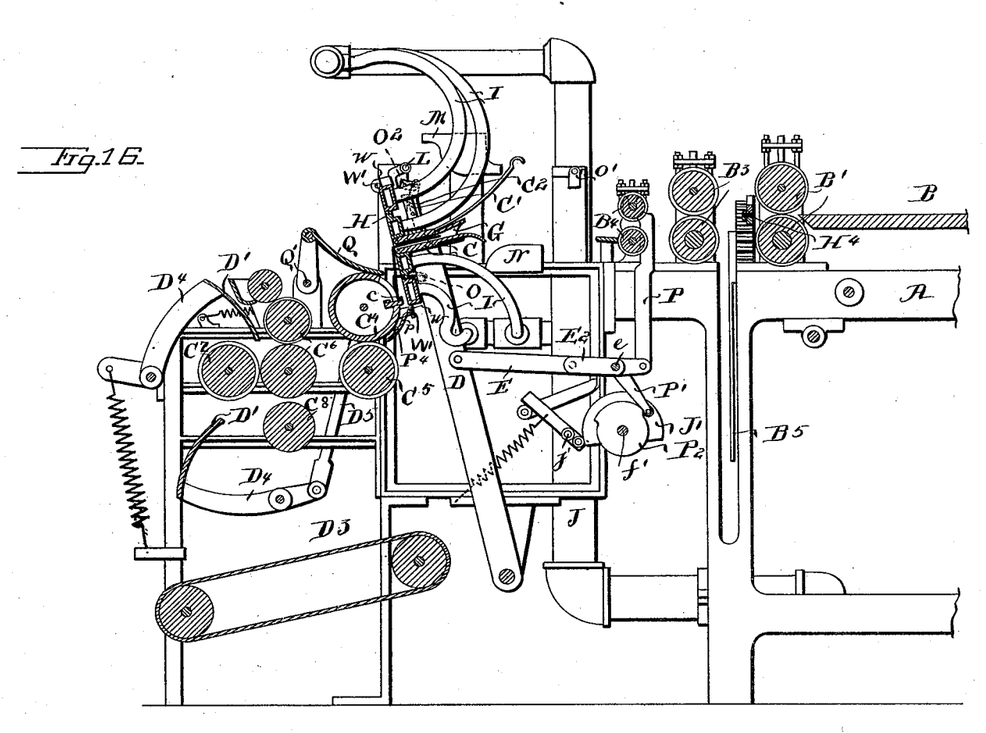
Fig. 16 is a longitudinal vertical sectional view similar to Fig. 4 showing the bottom formers in the position of delivering the tube section to the final folding and pasting apparatus.

These pins are normally held out of action by the rear portions of the fingers V, which extend over the pins when the fingers are in their inoperative positions as shown in Fig. 5. When, however, the fingers are moved upon their pivots so as to throw their front ends over the faces of the former sections, the rear ends are moved from over the pins W which are projected forward by their springs and enter the notches in the rear of the fingers.

W' are projections located in front of the formers H, H adapted when the formers reach the end of their forward reciprocation to strike the free extended ends of the springs $w$ which carry the pins W and depress them retracting the pins and permitting the fingers V, V to be moved back by the springs V'.

X are hooks or projections carried by the stationary frame adapted to catch the rear ends of the fingers V, V as they are carried forward by the formers, and throw their outer ends inward over the face of the formers so as to act on the sides of the paper tube. These fingers or hooks X are so located that they will act upon the fingers V, when the formers reach that position in their movements, that they are in the act of opening up the paper tube to form the square box shape. At this moment the hooks or fingers engage the ends of the fingers V and move their outer ends inward over the paper into the angular or diamond side folds. This movement of the fingers V into the open sides of the paper tube assists the suction of the formers in properly shaping the creases and prevents rumpling of the paper. The instant the fingers V, V are thus moved in by the hooks X they are locked by the spring pins W and remain locked until the formers H H have reached such a position that the projections W' strike the projecting ends $w$ of the wires and thus retract the pins W and permit the fingers V to return to their normal positions under the action of the springs V'.

The operation of this machine is as follows: The paper is formed into the bellows side fold tube by the tube forming apparatus B. The tube passes under the rollers B' B' and is cut into the proper lengths or sections by the stationary cutter $B^2$ and the moving cutter $B^5$. The tube sections are taken from the cutters by the rollers $B^3$ $B^3$ and are delivered to the feed rollers $B^4$ $B^4$ by which they are fed to the formers H, H passing through the chute G and lying between the frames C, C with their ends which are to be formed into the bottom of the bag between the formers H, H. The carriers or frames C, C are clamped together by suitable mechanism to hold the tube firmly. The carriers and formers are reciprocated forward and by the action of the cams M, M and N, N the former sections are guided apart and caused to assume different angular relations. The successive positions assumed by the former sections are shown in Figs. 7, 6, 8 and 9. The paper which adheres to the suction faces of the formers is drawn open from the position shown in Fig. 10 first to that shown in Fig. 11, next to the square box shape shown in Fig. 12 and finally when the formers are fully opened up into the condition shown in Fig. 13. At the time the formers assume the position indicated in Fig. 6 and open the paper in substantially the condition shown in Fig. 11 the fingers V, V are operated by the hooks X so as to be thrown into the side of the bellows tube, and assist in the formation of creases which the paper must take to assume the square box shape shown in Fig. 12. When the formers are opened out the projections W' strike the springs $w$ and retract the locking pins W, so that the fingers V move back into their normal inactive positions. The frames C, C are now unclamped so as to release the tube, one of the flaps of which is gripped by the jaw $c^4$ and the tube passes through the final folding and pasting devices, when the formation of the bottom is completed in the usual manner. The carriers C, C move back to their original position and receive the next tube section when the operations first described are repeated.

A machine of the general character described is shown in my former applications, Serial No. 441,005, filed July 5, 1892, and Serial No. 471,748, filed April 25, 1893.

I shall now describe particularly the improvements which form the subject matter of the present invention.

The upper carrier or frame C is hinged at the rear to the lower carrier or to a common frame as at $c$ with sufficient space intervening to admit the tube sections. The front end of the upper carrier is free to fall with its edge in contact with the lower carrier so as to clamp the paper tube. (See dotted lines in Fig. 7.) In connection with these carriers I employ a suitable lock to hold the upper carrier C in a raised position. This lock is preferably constructed as follows:

C' is a projecting arm carried by the upper carrier. $C^2$ is a dog pivoted to the lower carrier C, or to the frame which carries it. One of these parts as C', is provided with a pin or lug $c'$ and the other as $C^2$ with a notch $c^2$ adapted to engage the lug $c'$, thereby holding the movable frame or carrier C in a raised position as is shown in full lines in Fig. 7. The dog $C^2$ may be held normally raised, by a spring $C^3$. The dog $C^2$ acting in connection with the arm C constitutes a lock to hold the upper frame C in a raised position.

Figures 4, 15:
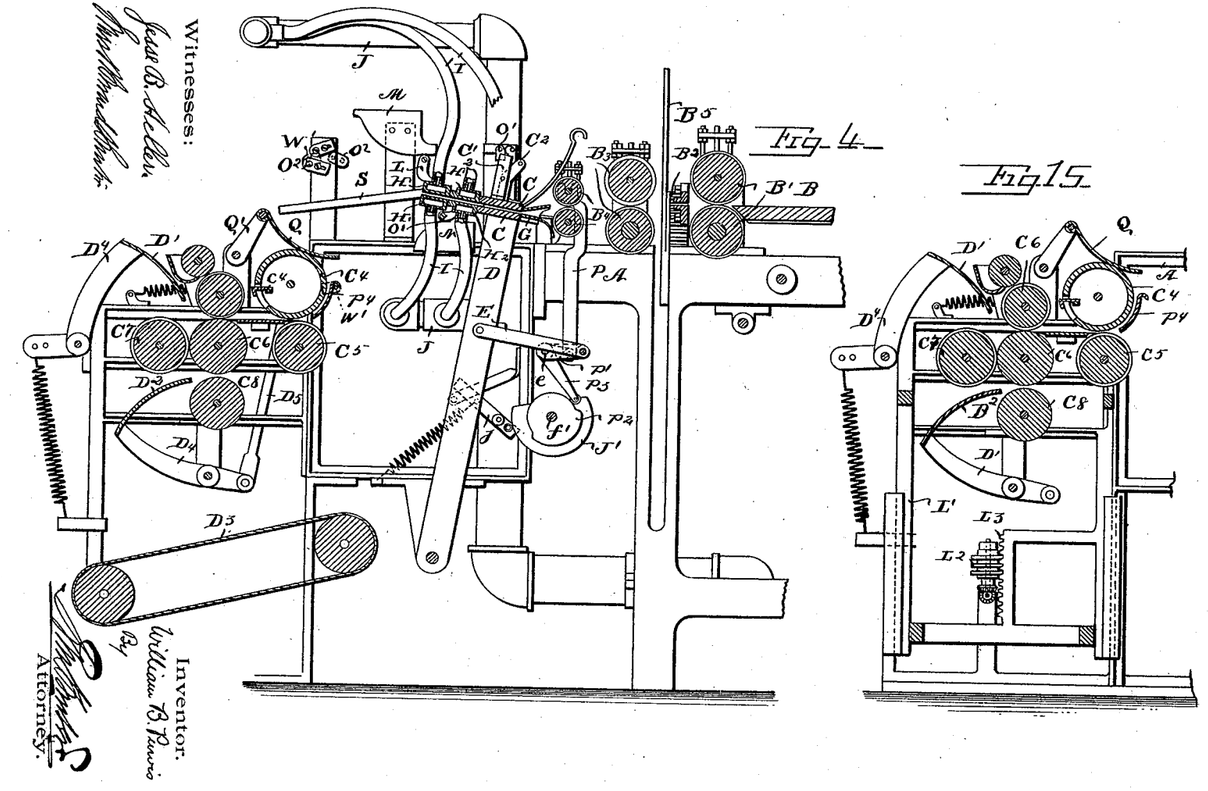
Fig. 4 is a longitudinal vertical sectional view on the line $x-x$ of Fig. 3.
Fig. 15 is a longitudinal vertical sectional view of the final folding and pasting apparatus, showing a construction which may be employed for adjusting that apparatus to suit different sizes of paper bags.

O' (Fig. 4) is a trip or spring dog carried by the frame A of the machine, located above the dog $C^2$ and in position to strike it when the carriers C, C commence their forward movement. The trip O' is held against movement forward but it is free to swing back against the action of its spring. When the carriers start to move forward after the paper tube has been fed between them, the trip O' strikes the dog C² and releases it from the arm C', permitting the upper carrier C to drop and clamp the paper tube.

O² is a stop or second trip located at the front of the machine in position to strike the arm C' and thereby lift the upper carrier C to unclamp the paper tube. When the upper carrier C is thus lifted the dog C² snaps into engagement with the arm C' and locks the upper carrier in its raised position. When the parts move back the dog C² strikes the trip O' and pushes it aside without being operated by it, so that the carriers C, C remain open in position to receive the next paper tube.

Figure 1:
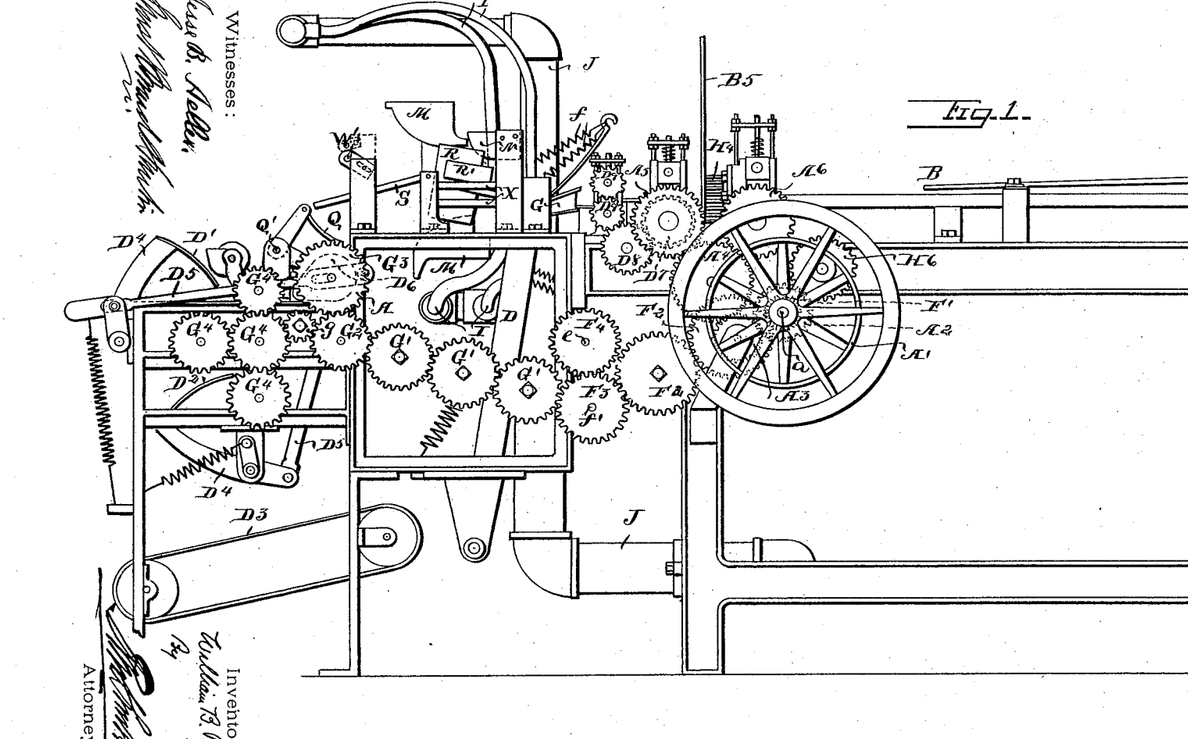
Figure 1 is a side elevation of a paper bag machine embodying my improvements.
Figure 2:
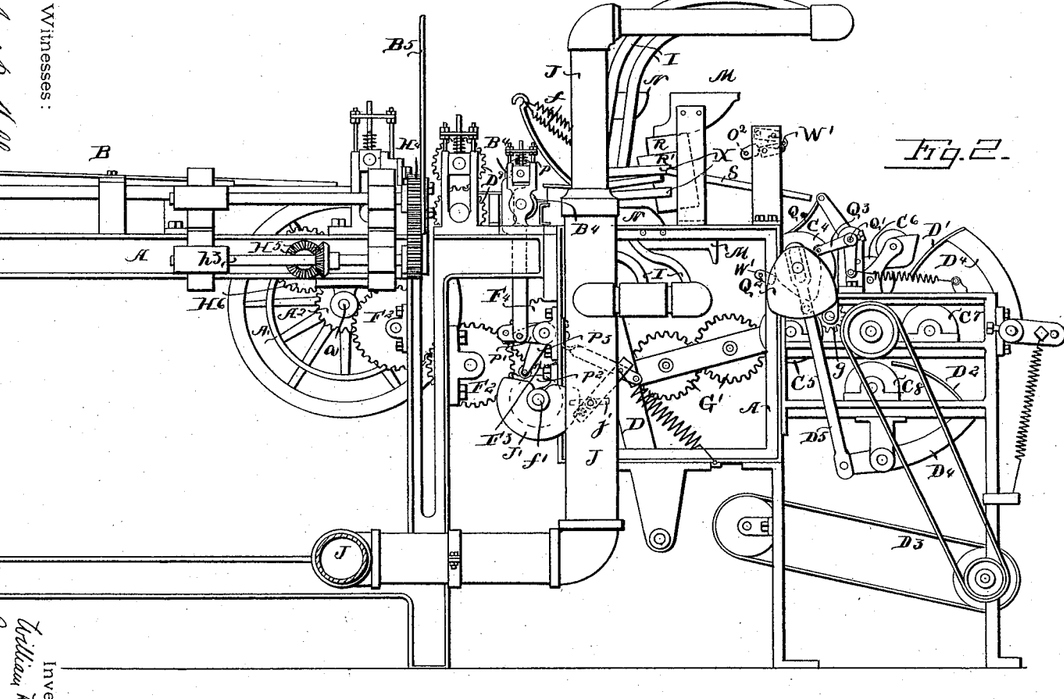
Fig. 2 is a similar view of the opposite side of the machine.
Figure 3:
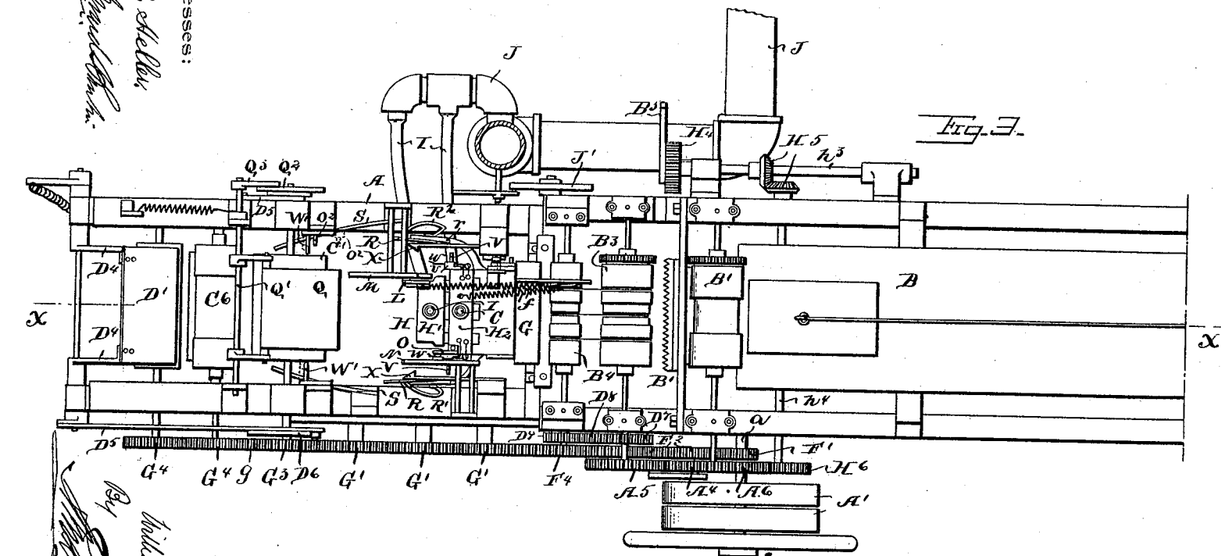
Fig. 3 is a plan view of the machine.

For the purpose of positively releasing the tube sections when they are fed to the carriers C, C so that there may be no back pull upon them, I employ means to intermittently separate the feeding rollers. In the drawings I have shown the feed rollers B⁴ B⁴ constructed to positively release the tube. For this purpose the shaft of the upper feed roller B⁴ is journaled in sliding boxes $p$ carried by arms P, P which are intermittently reciprocated by bell cranks P' operated by cams P² on the shaft $f'$. (See Figs. 2 and 4.) By this means the upper feed roller B⁴ is intermittently lifted to release the tube. The operation of the parts may be so timed that the releasing of the tube by the roller B⁴ will take place at the moment it is clamped by the formers C, C.

To prevent the wrinkling of the paper when the tube is stripped from the formers, and passes to the final folding and pasting devices, I employ a reciprocating smoothing plate Q which may be operated in any convenient manner. I have shown this plate Q carried upon a rock shaft Q' and located above the stripping roller C⁴. The rock shaft Q' is operated from a cam Q² on the shaft of the roller C⁴ through an arm Q³. The smoothing plate reciprocates back and forth and moves in contact with the folded bottom of the tube shown in Fig. 13 as it is stripped from the formers keeping it flat and preserving the folds made by the suction formers. P⁴ is a guide plate adjacent to the roller C⁴ which acts to guide the flap of the folded tube to the roller. The outer edge of this plate P⁴ is preferably rounded or turned.

When the suction formers of the machine are changed to construct a different size of bag, it becomes necessary to adjust the stripping devices so that they may be located in proper position to act upon the larger or smaller bag bottoms. For this purpose I prefer to arrange the stripping, pasting and final folding devices in a movable frame L' (see Fig. 15) which may be raised and lowered in the stationary frame A so as to elevate or lower the stripping rollers into proper position to take the bag sections from the formers. By means of worms L² and racks L³ the movable frame L' may be raised or lowered.

I do not limit myself to such details of construction as I have shown, for the purpose of more clearly illustrating my invention, as it is evident that the same may be varied without departing from the claims.

What I claim as new, and desire to secure by Letters Patent, is—

1. In a paper bag machine, a bottom forming device consisting of frames hinged together at the rear and adapted to clamp the paper tube section between their front edges, and movable suction formers carried by the frames and extending beyond their front edges.

2. In a paper bag machine, a bottom forming device consisting of frames hinged together at the rear and adapted to clamp the paper tube section between their front edges, a lock adapted to lock the upper frame in a raised position so as to admit the paper tube, and movable suction formers carried by the frames and extending beyond their front edges.

3. In a paper bag machine, a bottom forming device consisting of frames hinged together at the rear and adapted to clamp the paper tube section between their front edges, a lock adapted to lock the upper frame in a raised position so as to admit the paper tube, movable suction formers carried by the frames and extending beyond their front edges, and a trip to operate the lock and release the frame.

4. In a paper bag machine, a bottom forming device consisting of frames hinged together at the rear and adapted to clamp the paper tube section between their front edges, a lock adapted to lock the upper frame in a raised position so as to admit the paper tube, movable suction formers carried by the frames and extending beyond their front edges, a trip to operate the lock and release the frame, and a second trip to operate the lock and relock the frame.

5. In a paper bag machine, the combination of intermittently actuated clamping frames between which the paper tube to be formed is fed, movable suction formers located in front of the clamping frames for forming the ends of the tube when clamped by the frames, and intermittently separated feeding rollers to feed the paper tube sections between the clamping frames and release them when the frames are actuated to clamp the tube.

6. In a paper bag machine, the combination with bottom forming devices, for partially forming the bag bottom of stripping devices to strip the bag sections from the bottom forming devices, and a reciprocating smoothing plate arranged adjacent to the stripping devices to pass over the partially formed bag bottom as it is stripped from the bottom forming devices.

7. In a paper bag machine, the combination with the bottom forming devices, and the stripping roller C' of the reciprocating smoothing plate Q arranged adjacent to the stripping roller C' and adapted to move over the end of the paper tube as it is stripped from the bottom forming devices.

8. The bottom formers consisting of the hinged frames C, C suction formers H, H arm C', and dog C² adapted to engage and carried one by each frame C, C, the trip O' arranged to actuate the dog C² and disengage it from the arm C' and the trip O² to actuate the arm C' and re-engage it with the dog O².

In testimony of which invention I have hereunto set my hand.

WILLIAM B. PURVIS.

Witnesses:
ERNEST HOWARD HUNTER,
HELEN L. MOTHERWELL.